(12) United States Patent
Ohnishi et al.

(10) Patent No.: US 11,187,848 B2
(45) Date of Patent: Nov. 30, 2021

(54) IMAGE DISPLAY DEVICE (71) Applicant: Panasonic Intellectual Property Management Co., Ltd., Osaka (JP)

(72) Inventors: Masaaki Ohnishi, Osaka (JP); Takamitsu Isono, Osaka (JP); Mitsuhiro Namikoshi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/620,462

(22) PCT Filed: May 22, 2019

(86) PCT No.: PCT/JP2019/020223
§ 371 (c)(1),
(2) Date: Dec. 6, 2019

(87) PCT Pub. No.: WO2019/230515
PCT Pub. Date: Dec. 5, 2019

(65) Prior Publication Data
US 2021/0003772 A1   Jan. 7, 2021

(30) Foreign Application Priority Data

May 31, 2018   (JP) .............................. JP2018-105221

(51) Int. Cl.
*F21V 8/00*   (2006.01)
*G02F 1/1333*   (2006.01)
*H04N 5/64*   (2006.01)
(52) U.S. Cl.
CPC ..... *G02B 6/0088* (2013.01); *G02F 1/133308* (2013.01); *H04N 5/64* (2013.01)

(58) Field of Classification Search
CPC .... G02B 6/0088; G02F 1/133308; H04N 5/64
See application file for complete search history.

(56) References Cited

U.S. PATENT DOCUMENTS

2003/0063456 A1 *   4/2003   Katahira .............. G02B 6/0076
362/23.16
2009/0225253 A1 *   9/2009   Oohira ................. G02B 6/0073
349/58

(Continued)

FOREIGN PATENT DOCUMENTS

CN         1982968 A   *   6/2007   ....... G02F 1/133308
CN     101430845 A   *   5/2009   ....... G02F 1/133308

(Continued)

OTHER PUBLICATIONS

International Search Report issued in corresponding International Patent Application No. PCT/JP2019/020223, dated Jul. 2, 2019, with English translation.

(Continued)

*Primary Examiner* — Mary Ellen Bowman
(74) *Attorney, Agent, or Firm* — McDermott Will & Emery LLP (57) ABSTRACT

An image display device includes a display panel that displays an image on a front surface; a light guide plate that is disposed on a rear surface of the display panel; a support plate that supports the light guide plate, and extends beyond at least one lateral surface of the light guide plate in a front view of the light guide plate; a light-emitting diode (LED) unit that emits light into an incident surface of the light guide plate; and a shade that, in a lateral view of the light guide plate and the LED unit, covers a gap between the LED unit and the light guide plate, and seals a gap between the display panel and the support plate.

7 Claims, 6 Drawing Sheets

(56) References Cited

U.S. PATENT DOCUMENTS

| | | | | |
|---|---|---|---|---|
| 2009/0303409 | A1* | 12/2009 | Park | G02F 1/133615 |
| | | | | 349/58 |
| 2010/0118229 | A1* | 5/2010 | Kim | B29C 45/14065 |
| | | | | 349/64 |
| 2014/0092340 | A1* | 4/2014 | Jeong | G02B 6/0086 |
| | | | | 349/60 |
| 2015/0301272 | A1* | 10/2015 | Chang | G02B 6/005 |
| | | | | 349/58 |
| 2017/0184910 | A1 | 6/2017 | Lee | |

FOREIGN PATENT DOCUMENTS

| | | | | |
|---|---|---|---|---|
| JP | 2008-9164 A | | 1/2008 | |
| JP | 2018-45197 A | | 3/2018 | |
| KR | 20140064393 A | * | 5/2014 | ............ G02B 6/0091 |
| WO | WO-2012165249 A1 | * | 12/2012 | ............ G02B 6/0091 |
| WO | WO-2013077568 A1 | * | 5/2013 | ............ G02B 6/0031 |
| WO | WO-2014208128 A1 | * | 12/2014 | ........ G02F 1/133308 |

OTHER PUBLICATIONS

Extended European Search Report dated Jun. 29, 2021 issued in counterpart European Patent Application No. 19809700.8.

* cited by examiner

IMAGE DISPLAY DEVICE

CROSS-REFERENCE OF RELATED APPLICATIONS

This application is the U.S. National Phase under 35 U.S.C. § 371 of International Patent Application No. PCT/JP2019/020223, filed on May 22, 2019, which in turn claims the benefit of Japanese Application No. 2018-105221, filed on May 31, 2018, the entire disclosures of which Applications are incorporated by reference herein.

TECHNICAL FIELD

The present disclosure relates to an image display device including a display panel that displays an image.

BACKGROUND ART

Patent Literature (PTL) 1 discloses an image display device including a light guide plate that receives light emitted by a light-emitting module, a plate-shaped housing that accommodates the light guide plate, and a display panel that is illuminated by light emitted from an opening in the housing.

CITATION LIST

Patent Literature

PTL 1: Japanese Unexamined Patent Application Publication No. 2018-45197

SUMMARY OF THE INVENTION

Technical Problem

The present disclosure provides an image display device capable of limiting light leakage from edges thereof.

Solution to Problem

A image display device in the present disclosure includes a display panel that displays an image on a front surface; a light guide plate that is disposed on a rear surface of the display panel; a light-emitting module that emits light into an edge surface of the light guide plate; and a shade that, in a lateral view of the light guide plate and the light-emitting module, covers a gap between the light-emitting module and the light guide plate, and seals a gap between the display panel and the support plate.

Advantageous Effect of Invention

The present disclosure makes it possible to limit light leakage from edges of an image display device.

DESCRIPTION OF EXEMPLARY EMBODIMENT

The inventors have identified the following problem related to conventional image display devices. Conventionally, image display devices, e.g. liquid crystal television sets, include a bezel that covers a periphery of a display panel such as a liquid crystal panel. The bezel included in the image display devices is, for example, rectangular and ring-shaped such as the lateral plates and cover in PTL 1.

In recent years, however, there has been demand for image display devices to be thinner, and the inventors have advanced their studies of a structure of an image display device not including a frame surrounding a periphery of a display panel in response to this demand.

To be specific, when a frame surrounding the periphery of the display panel is not disposed on the image display device, a structure in which, for example, the display panel is supported at a rear surface thereof is employed since the display panel cannot be supported at the periphery thereof. In other words, a display unit is formed by disposing, for example, a metal plate on the rear surface of the display panel, and this metal plate is directly or indirectly fixed to, for example, a stand with screws. In other words, the stand is coupled with screws to the metal plate disposed on the rear surface of the display unit. With this, an image display device having a structure in which the periphery of the display panel is not surrounded by a frame is implemented.

In the assembly of this image display device, adhesive tape cut at a predetermined length is usually prepared when taping together the light guide plate and the display panel using adhesive tape, and this adhesive tape is applied after fixing the light guide plate with a jig when applying the adhesive tape to the light guide plate. One end of the adhesive tape is applied to a lateral surface of the light guide plate while being fixed to the light guide plate, but the adhesive tape may not be long enough at another end thereof or misalignment may occur due to the misalignment in the applying of the tape. This misalignment forms a gap, and light emitted by a light source of the light-emitting module may leak from the edges of the image display device. It is difficult to accurately apply the adhesive tape to the edges of the light guide plate so that light leakage does not occur from the edges of the display panel, thus, it is difficult to limit light leakage from the edges of the image display device.

Accordingly, the present disclosure is based on this observation and provides an image display device capable of limiting light leakage from the edges thereof.

Hereinafter, an embodiment will be described with reference to the drawings when appropriate. However, unnecessarily detailed descriptions may be omitted. For example, detailed descriptions of well-known matters or descriptions of components that are substantially the same as components described previous thereto may be omitted. This is to avoid redundancy and facilitate understanding of the descriptions for those skilled in the art.

Note that the accompanying drawings and subsequent description are provided by the inventors to facilitate sufficient understanding of the present disclosure by those skilled in the art, and are thus not intended to limit the scope of the subject matter recited in the claims.

In the subsequent embodiment, the top-bottom direction coincides with the Y-axis, the front-back direction coincides with the Z-axis, and the left-right direction (lateral direction) coincides with the Y-axis for the sake of description, but these do not limit the orientation of the image display device according to the present disclosure during at the time of manufacture or usage. In the subsequent description, for example, the positive end of the X-axis indicates the direction of the arrow of the X-axis and a negative end of the X-axis indicates the end opposite to the positive end of the X-axis. The same applies to the Y-axis and the Z-axis.

Hereinafter, the image display device according to the embodiment of the present disclosure will be described.

EMBODIMENT

Overall Configuration of Image Display Device

Figure 1:
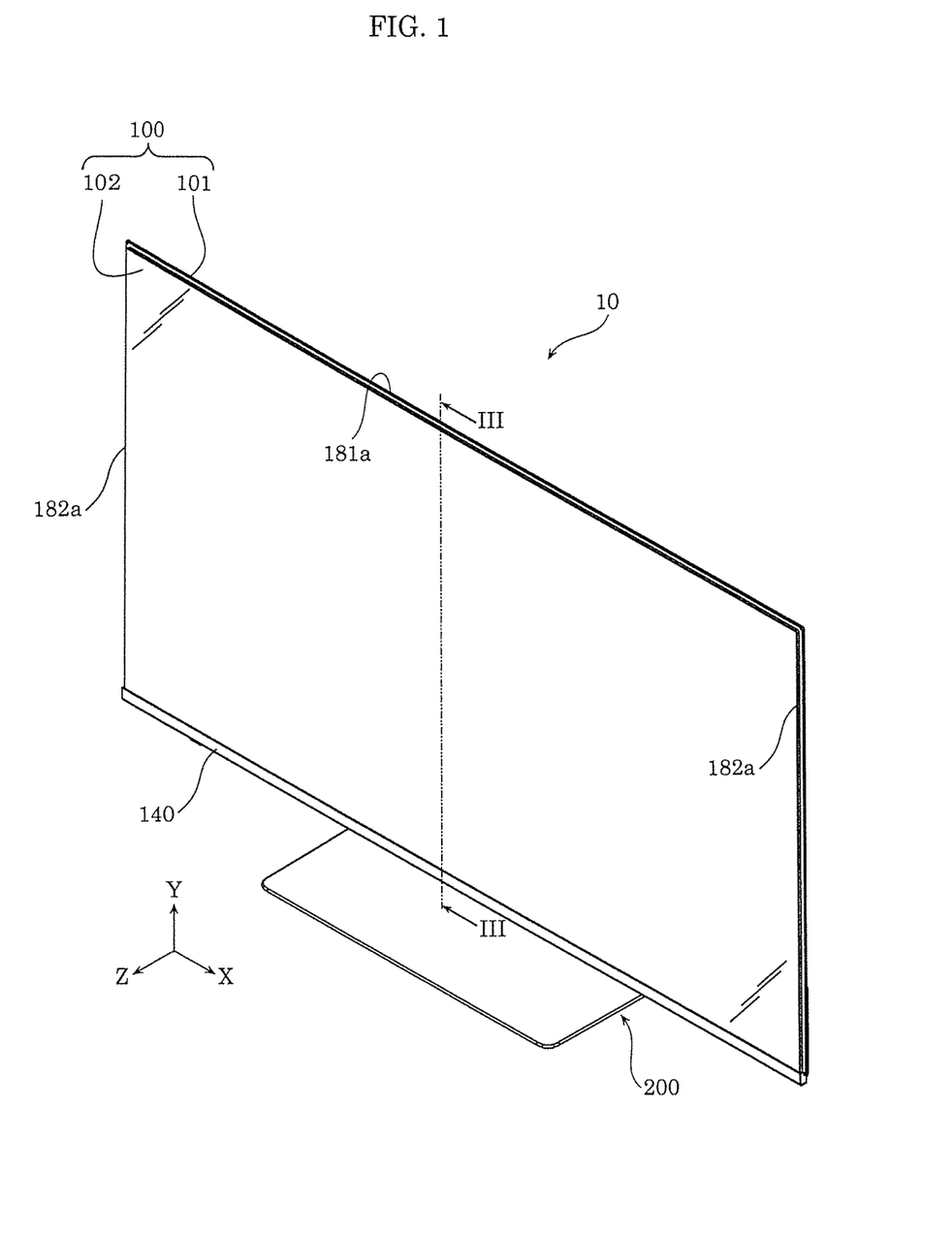
FIG. 1 is a perspective view of a front surface of an image display device according to an embodiment.

FIG. 1 is a perspective view of a front surface of image display device 10 according to the embodiment.

As illustrated in FIG. 1, image display device 10 is, for example, a flat panel liquid crystal television set. Image display device 10 includes display unit 100 and stand 200 that supports display unit 100.

Display unit 100 includes display panel 102 that displays an image on a front surface (surface at the positive end of the Z-axis), light guide plate 103 that emits light to display panel 102, and support plate 101 that is disposed on the rear surface of display panel 102 (negative end of the Z-axis) and supports display panel 102 via light guide plate 103 which will be described later.

Figure 2:
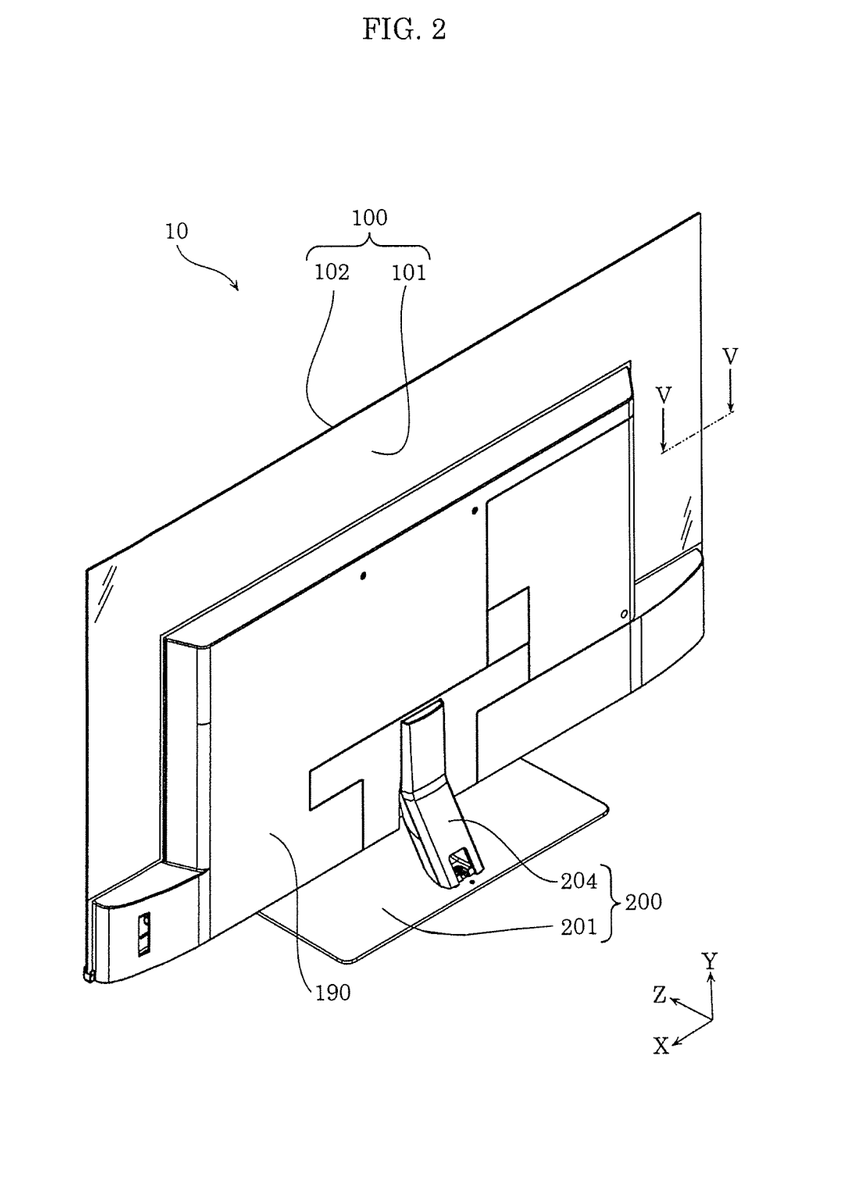
FIG. 2 is a perspective view of a rear surface of the image display device according to the embodiment.

FIG. 2 is a perspective view of a rear surface of image display device 10 according to the embodiment. As illustrated in FIG. 2, back cover 190, which is, for example, a resin cast component, is disposed on the rear surface of display unit 100. Back cover 190 covers a portion of a rear surface of support plate 101 and exposes other portions. Note that back cover 190 includes multiple components, e.g. a body and cover plate, but in the present embodiment, these multiple components are treated as back cover 190.

Figure 3:
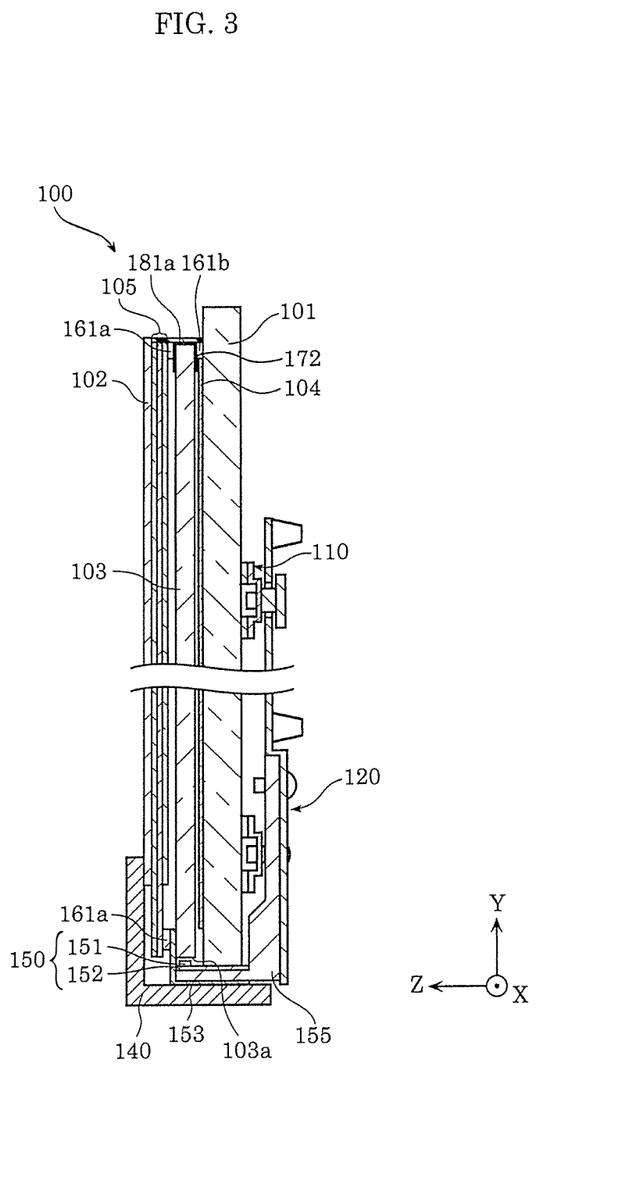
FIG. 3 is a cross-sectional view of the image display device along line III-III in FIG. 1.

In the present embodiment, display panel 102 included in display unit 100 is a liquid crystal cell and displays an image on the front surface due to the light being transmitted through optical sheet unit 105. As illustrated in FIG. 3, display unit 100 includes optical sheet unit 105, light guide plate 103, and reflection plate 104 between display panel 102 and support plate 101. FIG. 3 is a lateral view of a configuration outline of display unit 100 according to the embodiment along line in FIG. 1. In FIG. 3, back cover 190 and stand 200 are omitted.

It is omitted in the drawings, but display panel 102 extends beyond a right side lateral surface, upper side lateral surface, and left side lateral surface of light guide plate 103 in a rear view of display panel 102 and light guide plate 103.

Display panel 102, optical sheet unit 105, light guide plate 103, and reflection plate 104 form an integrated structure due to adhesive tape 161b and the like disposed at a periphery, and this structure is fixed to support plate 101. In other words, display unit 100 in which display panel 102, optical sheet unit 105, light guide plate 103, reflection plate 104, and support plate 101 are respectively stacked on one another, is treated as one structure in the assembly process of image display device 10. Note that adhesive, etc. may be used instead of adhesive tape 161b.

Optical sheet unit 105 is a light-transmissive component that diffuses and concentrates light. Optical sheet unit 105 is disposed on the rear surface of display panel 102. Optical sheet unit 105 receives the light emitted from light guide plate 103 on a rear surface thereof, and diffuses, concentrates, and emits the incident light to display panel 102. Optical sheet unit 105 is directly laminated on the rear surface of display panel 102 through a laminating process. Optical sheet unit 105 includes at least one optical sheet, e.g. a diffusion sheet or light concentration sheet.

Light guide plate 103 receives the light emitted from light-emitting diode (LED) unit 150 at incident surface 103a thereof, guides this light, and emits the light from a front surface of light guide plate 103 toward display panel 102. The light emitted by light guide plate 103 is emitted toward the rear surface of optical sheet unit 105. Incident surface 103a is an example of an edge surface.

Figure 4:
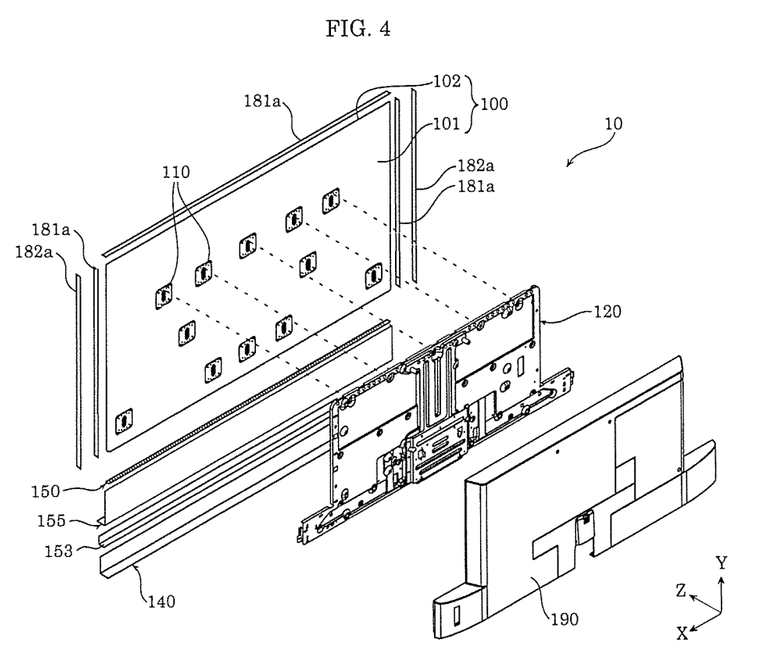
FIG. 4 is an exploded perspective view of the image display device according to the embodiment.

As illustrated in FIG. 1, FIG. 3, and FIG. 4, shading tape 172 is applied to three sides of light guide plate 103 excluding incident surface 103a that receives the light emitted by LED unit 150. FIG. 4 is an exploded perspective view of image display device 10 according to the embodiment.

To be specific, shading tape 172 is applied extending over the front surface, lateral surface, and rear surface at the edges of light guide plate 103. Shading tape 172 limits the light guided by light guide plate 103 from being emitted from the edge surfaces of light guide plate 103. Shading tape 172 does not only, for example, limit the light from being emitted, but may also reflect the light. Shading tape 172 may also be conductive.

Light guide plate 103 is a light-transmissive component. Light guide plate 103 is fixed to the rear surface of optical sheet unit 105 with adhesive tape 161a. This adhesive tape 161a is applied frontward of shading tape 172 in an overlapping state therewith. Note that an adhesive and the like may be used instead of adhesive tape 161a. Light guide plate 103 is fixed to support plate 101 by applying adhesive tape to an upper edge, left edge, and right edge of the rear surface of light guide plate 103.

Support plate 101 is a glass plate made of, for example, tempered glass. Light guide plate 103 is fixed to a front surface of support plate 101 via adhesive tape 161b. Fitting components 110 are fastened to the rear surface of support plate 101. This adhesive tape 161b is applied rearward of shading tape 172 of light guide plate 103 in an overlapping state therewith.

Support plate 101 supports light guide plate 103 and extends beyond the lateral surfaces of light guide plate 103 in a front view of light guide plate 103. In other words, an area of the front surface of support plate 101 is larger than an area of the front surface of light guide plate 103.

Figure 5:
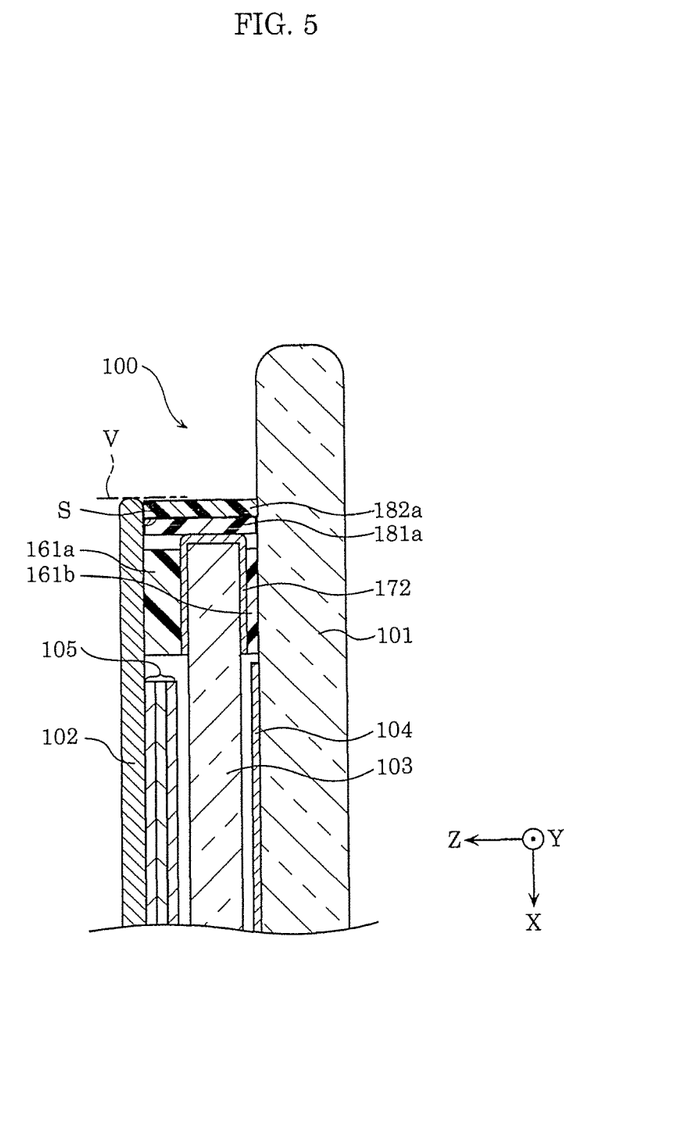
FIG. 5 is a cross-sectional view of the image display device along line V-V in FIG. 2.

As stated above, due to the relationship between display panel 102, light guide plate 103, and support plate 101, gap S is formed at a periphery of light guide plate 103 between display panel 102 and support plate 101. FIG. 5 is a cross-sectional view of image display device 10 along line V-V in FIG. 2.

As illustrated in FIG. 3, reflection plate 104 is a mirror and the like that reflects light. Reflection plate 104 is fixed to the front surface of support plate 101. In other words, reflection plate 104 is disposed between support plate 101 and light guide plate 103, and fulfills the role of returning the light emitted from the rear surface of light guide plate 103 back to light guide plate 103.

As illustrated in FIG. 3 and FIG. 4, LED unit 150, which emits the light into incident surface 103a of light guide plate 103, is disposed as to face incident surface 103a of light guide plate 103. The light emitted from LED unit 150 is transmitted from incident surface 103a of light guide plate 103 to an interior of light guide plate 103, and is received by display panel 102 via optical sheet unit 105 disposed on the front surface of light guide plate 103. Optical sheet unit 105 includes at least one optical sheet, e.g. a diffusion sheet or light concentration sheet. In other words, in the present embodiment, light for displaying an image is supplied to display panel 102, which is a liquid crystal cell, using an edge-lit backlight. LED unit 150 is an example of a light-emitting module.

LED unit 150 includes substrate 152 elongated along incident surface 103a of light guide plate 103, and LED elements 151 arranged on an upper side surface of the elongated substrate 152. Note that in LED unit 150, LED elements 151 are disposed on one substrate 152, but LED unit 150 may include multiple substrates each having at least one LED element 151 arranged along incident surface 103a of light guide plate 103. In other words, LED unit 150 may include multiple, separate LED modules.

In the present embodiment, LED unit 150 is supported from below by light source support 155. Light source support 155 is a metallic component made of, for example, aluminum, and functions as a heat-radiating component (heat sink) for emitting heat emitted from LED unit 150. Light source support 155 is an example of a support.

Light guide panel 153 is fixed to a lower edge of light source support 155 in an orientation that blocks the light emitted frontward by LED unit 150. Light guide panel 153 is a metal fixture and an L-shaped panel elongated along the X-axis. One surface of light guide panel 153 contacts a lower edge of light guide plate 103, another surface of light guide panel 153 is disposed on the lower edge of light source support 155, and light guide panel 153 is with a fixing component, e.g. a screw.

Display unit 100 further includes electrical conductor 181a disposed at a periphery of light guide plate 103, and shade 182a.

Electrical conductor 181a is an elongated, strip-shaped or sheet-shaped component, and in the present embodiment, has a thickness of approximately 0.2 mm. In the present embodiment, electrical conductor 181a is black and a polyethylene terephthalate component, etc. Electrical conductor 181a is disposed at the periphery of light guide plate 103 to seal gap S between display panel 102 and support plate 101. To be specific, electrical conductor 181a is disposed on the three sides of light guide plate 103 included in display unit 100 excluding a lower edge of display unit 100. In other words, electrical conductor 181a covers a left side surface, upper side surface, and right side surface of display unit 100. With this, it is more difficult to harm the aesthetic appearance of image display device 10 since it is possible to conceal light guide plate 103 and the like.

Electrical conductor 181a directly or indirectly electrically connects light guide plate 103 and light source support 155. With this, electrical conductor 181a causes static electricity produced by light guide plate 103 to be directly or indirectly discharged to light source support 155. Light source support 155 being directly or indirectly electrically connected to light guide plate 103 here not only means that light source support 155 and light guide plate 103 are directly electrically connected, but also includes light source support 155 being indirectly electrically connected to light guide plate 103 via a metallic component, e.g. a screw. In the present embodiment, electrical conductor 181a is applied up to light guide panel 153, and light guide panel 153 causes static electricity of light guide plate 103 to be indirectly discharged.

Shade 182a is an elongated, strip-shaped or sheet-shaped component, and in the present embodiment, has a thickness of approximately 0.2 mm. In the present embodiment, shade 182a is black and a polyethylene terephthalate component and the like. The width of shade 182a is the same as the width of electrical conductor 181a, and the width of gap S is also the same.

Figure 7:
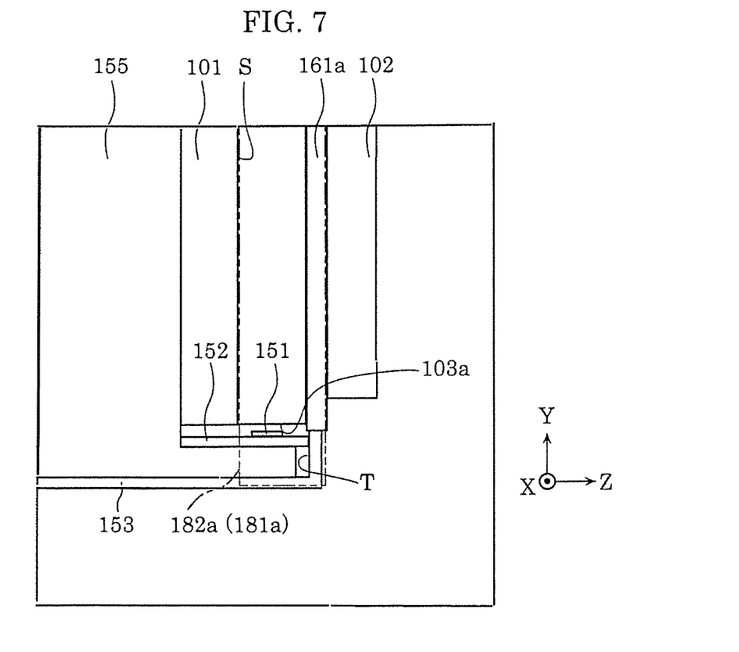
FIG. 7 is a diagram showing a lateral surface of the display unit before the shade is disposed thereon.

Shade 182a is disposed on the inside or outside of electrical conductor 181a. In the present embodiment, shade 182a is disposed on the outside of electrical conductor 181a. Shade 182a covers the gap between LED unit 150 and light guide plate 103, and seals gap S between and display panel 102 and support plate 101. With this, as illustrated in FIG. 7 that will be described later, shade 182a blocks the light so that the light passing between LED unit 150 and light guide plate 103 is not emitted to the outside in a lateral view of light guide plate 103 and LED unit 150.

Shade 182a blocks the light that passes between light guide plate 103 and LED unit 150. To be specific, shade 182a overlaps electrical conductor 181a in a lateral view of display unit 100, further extends from the lower edge of light guide plate 103 to light source support 155, covering the gap between light guide plate 103 and light source support 155, and a distal portion of shade 182a contacts light source support 155.

In this manner, the light is not emitted outside of display unit 100 since shade 182a blocks the light emitted from between light guide plate 103 and LED unit 150 or light source support 155, and from between light guide plate 103 and display panel 102. In this display unit 100, no light leakage occurs.

As illustrated in FIG. 5, conductor 181a and shade 182a are concealed by display panel 102, i.e., do not extend further to the left side than virtual line V when looking at image display device 10. It is not illustrated in the drawings, but electrical conductor 181a and shade 182a are concealed by display panel 102, i.e., do not extend further to the right side than virtual line V at the right side of image display device 10. Accordingly, the appearance of image display device 10 is not harmed since electrical conductor 181a or shade 182a does not extend beyond display panel 102. Virtual line V here is a straight line that passes through edges of display panel 102 and is parallel with the Z-axis.

In the present embodiment, as illustrated in FIG. 1 and FIG. 3, bezel 140 that covers a lower end portion of the front surface of display panel 102 is disposed on image display device 10. More specifically, bezel 140 includes a portion that covers the lower edge of the front surface of display panel 102, and a portion that is disposed below light source support 155. Bezel 140 and light source support 155 are fixed on image display device 10 by being directly or indirectly connected to base plate 120 that will be described later.

As illustrated in FIG. 2, stand 200 is a leg that makes image display device 10 independent, and includes a tabular stand base 201 and neck 204 that is disposed upright from stand base 201. Neck 204 is mechanically connected to display unit 100, and with this, stand 200 is fixed to display unit 100. Note that in the present embodiment, stand 200 is exemplified as a component for placing image display device 10, but image display device 10 may also include, for example, a wall-mounting unit for placing image display device 10 on a wall instead of stand 200.

Figure 6:
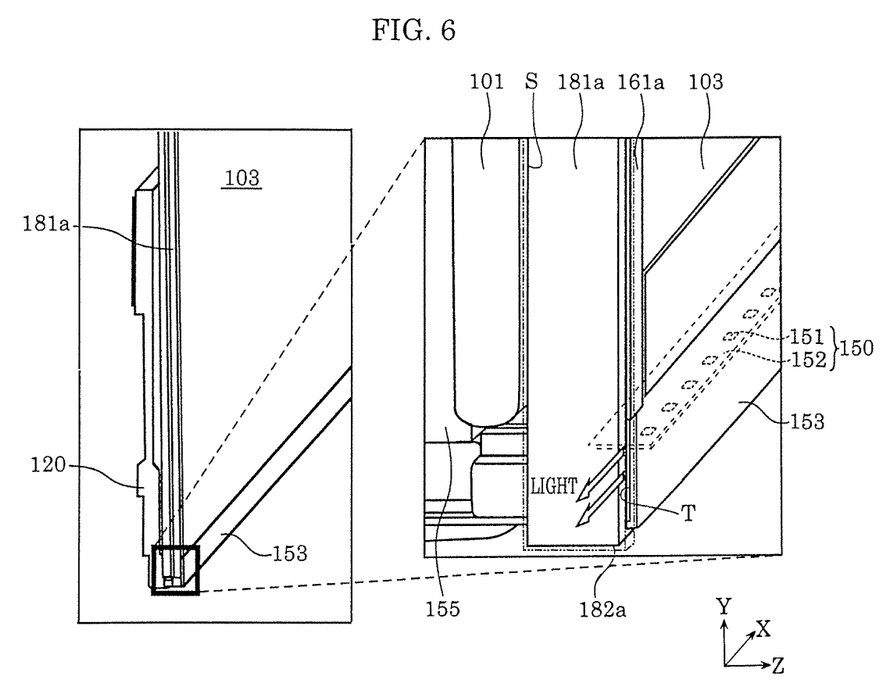
FIG. 6 is a perspective view of a display unit before a shade is disposed thereon and a perspective view in which a portion of the display unit after the shade is disposed thereon is enlarged, according to the embodiment.

In this image display device 10, in a perspective view in which a portion of display unit 100 after shade 182a is disposed thereon is enlarged, the light emitted from LED unit 150 leaks from gap T due to gap T being formed, as illustrated in FIG. 6 and FIG. 7. FIG. 6 is a perspective view of display unit 100 before shade 182a is disposed thereon and a perspective view in which the portion of display unit 100 after shade 182a is disposed thereon is enlarged, according to the embodiment. In FIG. 6, display panel 102 is omitted and shade 182a is shown as a chain double-dashed line. FIG. 7 is a diagram showing a lateral surface of display unit 100 before shade 182a is disposed thereon.

The light emitted from between LED unit 150 and light guide plate 103, and from between display panel 102 and support plate 101 is emitted from gap T in a lateral view of image display device 10. In the present embodiment, the light is emitted from gap T that is surrounded by at least light guide panel 153, light source support 155, and adhesive tape 161a.

As illustrated in FIG. 7, shade 182a further seals gap S and covers gap T by being disposed between display panel 102 and support plate 101. Accordingly, it is possible to limit light leakage from image display device 10 due to the light emitted from LED unit 150 being blocked by shade 182a.

In this image display device 10, support plate 101 disposed on the rear surface of display unit 100 is a glass panel, and as illustrated in FIG. 2, the upper, left, and right edges of support plate 101 are exposed from back cover 190 in a rear view of display unit 100. Therefore, when looking at image display device 10, a periphery of the portion displaying an image appears thin and a gloss particular to glass occurs on the rear surface thereof. In other words, it is possible to make image display device 10 thinner and make it aesthetically pleasing.

However, it is difficult to form screw holes for fixing base plate 120 on support plate 101 that is a glass panel. Accordingly, in image display device 10 according to the present embodiment, as illustrated in FIG. 3, a means is employed to fasten fitting components 110 to rear surface 101a of support plate 101, and fix base plate 120 to support plate 101 via fitting components 110.

Advantageous Effects, Etc.

As described above, image display device 10 according to the present embodiment includes display panel 102 that displays an image on the front surface; light guide plate 103 that is disposed on the rear surface of display panel 102; support plate 101 that supports light guide plate 103, and extends beyond the lateral surfaces of light guide plate 103 in the front view of light guide plate 103; LED unit 150 that emits light into incident surface 103a of light guide plate 103; and shade 182a that, in the lateral view of light guide plate 103 and LED unit 150, covers the gap between LED unit 150 and light guide plate 103, and seals gap S between display panel 102 and support plate 101.

As stated above, gap T may occur between light guide plate 103 and LED unit 150, and light guide plate 103 and display panel 102, as illustrated in FIG. 6 and FIG. 7. Accordingly, light leakage occurs due to the light being emitted from gap T between light guide plate 103 and LED unit 150 in the lateral view of image display device 10. In the present embodiment, light leakage is limited by disposing, for example, a bezel at the lower end of display unit 100, but the light reflected on an inner surface of the bezel leaks from the gap between bezel 140 and display unit 100, etc.

However, shade 182a blocks the light so that the light passing between light guide plate 103 and LED unit 150 is not emitted to the outside since the gap between LED unit 150 and light guide plate 103 is covered, and gap S between and display panel 102 and support plate 101 is sealed. This enables shade 182a to block the light passing through gap T even when gap T between LED unit 150 and light guide plate 103 is formed when taping together display panel 102 and light guide plate 103.

Therefore, in this image display device 10, it is possible to limit light leakage from the edges of image display device 10. Accordingly, the aesthetic appearance of image display device 10 during usage is not harmed since the light emitted from image display device 10 does not cause any discomfort to people.

Especially since shade 182a is disposed in the periphery of light guide plate 103, the appearance of image display device 10 is not harmed.

In image display device 10 according to the present embodiment, shade 182a is disposed on the lateral surfaces (left side surface, upper side surface, and right side surface) of image display device 10 to seal gap S between display panel 102 and support plate 101.

This configuration enables shade 182a, which seals gap S between display panel 102 and support plate 101, to support display panel 102 from a rear thereof even when a force is applied on edges of display panel 102 aimed at light guide plate 103. Accordingly, it is possible to limit damage to display panel 102 even when an excessive force is applied to the edges of display panel 102.

Image display device 10 according to the present embodiment further includes electrical conductor 181a disposed at the periphery of light guide plate 103; and light source support 155 that supports LED unit 150 in an orientation in which the light is emitted into incident surface 103a of light guide plate 103. Electrical conductor 181a directly or indirectly electrically connects light guide plate 103 and light source support 155.

When using image display device 10, light guide plate 103 builds up and accumulates static electricity, but this configuration enables electrical conductor 181a to discharge the static electricity built up in light guide plate 103 to light source support 155. Accordingly, it is possible to limit damage to light guide plate 103 by discharging the static electricity.

In image display device 10 according to the present embodiment, electrical conductor 181a and shade 182a are concealed by display panel 102 in the front view of image display device 10.

This configuration makes it possible to only see display panel 102 and support plate 101 supporting display panel 102 and the like without electrical conductor 181a and shade 182a protruding from display panel 102 in the front view of image display device 10. Accordingly, in a front view of the edges of image display device 10, it is possible for image display device 10 to appear as a more simple structure to people since electrical conductor 181a and shade 182a are not visible proximate to a boundary between display panel 102 and support plate 101. As a result, it is difficult to harm the aesthetic appearance of image display device 10.

Image display device 10 according to the present embodiment further includes light guide panel 153 that is fixed to light source support 155 in an orientation that blocks the light emitted frontward by LED unit 150. Shade 182a blocks the light from being emitted from between light guide panel 153 and light guide plate 103.

This enables shade 182a to more reliably limit light leakage from the edges of image display device 10 by blocking the light emitted from between light guide panel 153 and light guide plate 103.

OTHER EMBODIMENTS

An embodiment has been described above as the techniques disclosed in the present application. However, the technique in the present disclosure is not limited to the above embodiment; various changes, substitutions, additions, omissions, etc., may be made to the embodiment. Each component included in the above embodiment may be combined to achieve new embodiments. Accordingly, other embodiments will be exemplified hereinafter.

In image display device 10 of the present disclosure, shade 182a is disposed on the left and right sides of display unit 100, but may also be further disposed on the upper side of display unit 100. In this case, one strip of shade 182a may be applied to the three edges of light guide plate 103. In the present embodiment, shade 182a is equal in length on the left and right sides of display unit 100, but as long as shade 182a can cover the gap, there is no need for shade 182a to be equal in length on the left and right sides of display unit 100.

In image display device 10 of the present disclosure, three strips of shading tape 172 are applied respectively to the three edges of light guide plate 103 in the present embodiment, but one strip of shading tape 172 may also be applied to the three sides of light guide plate 103.

In image display device 10 of the present disclosure, in the present embodiment, one strip of electrical conductor 181a may be applied to the three edges of light guide plate 103, and electrical conductor 181a may be disposed on each of the three sides of light guide plate 103.

In image display device 10 of the present disclosure, a light-blocking component that blocks the light emitted by LED unit 150 from being incident on support plate 101 may be disposed between incident surface 103a of light guide plate 103 and support plate 101. In this case, the light-blocking component is capable of guiding a portion of the light emitted by LED unit 150 through the glass panel support plate 101, and blocking light leakage, i.e., the lower end edge of support plate 101 shining light.

Embodiments have been described above as the techniques disclosed in the present application. The accompanying drawings and detailed description are provided for this purpose.

Therefore, the components described in the accompanying drawings and the detailed description include, in addition to components essential to overcoming problems, components that are not essential to overcoming problems but are included in order to exemplify the techniques described above. Thus, those non-essential components should not be deemed essential due to the mere fact that they are illustrated in the accompanying drawings and described in the detailed description.

The above embodiments are for providing examples of the techniques in the present disclosure, and thus various modifications, substitutions, additions, and omissions are possible in the scope of the claims and equivalent scopes thereof.

INDUSTRIAL APPLICABILITY

The present disclosure can be applied to an image display device for displaying an image. To be specific, the present disclosure can be applied to a television set, monitor display, digital signage, etc.

The invention claimed is:

1. An image display device, comprising:
a display panel that displays an image on a front surface;
a light guide plate that is disposed on a rear surface of the display panel and has edge surfaces including a first edge surface, a second edge surface opposite to the first edge surface and third edge surfaces on lateral surfaces of the light guide plate between the first edge surface and the second edge surface;
a support plate that supports the light guide plate, and extends beyond at least one lateral surface of the light guide plate in a front view of the light guide plate;
a light-emitting module that emits light into the first edge surface of the light guide plate;
a bezel that is disposed, in a lateral view of viewing the light guide plate and the light-emitting module to face a third edge surface among the third edge surfaces, in front of the light guide plate and the light-emitting module such that light does not leak frontward from a gap between the light-emitting module and the first edge surface of the light guide plate; and
a shade that covers, in the lateral view, the gap between the light-emitting module and the first edge surface of the light guide plate on a third surface side, and seals, in the lateral view, a gap between the display panel and the support plate to block light that leaks from the gap.

2. The image display device according to claim 1, wherein the shade is disposed on each of two lateral surfaces of the image display device to seal the gap between the display panel and the support plate, respectively.

3. The image display device according to claim 1, further comprising:
an electrical conductor disposed at a periphery of the light guide plate; and
a support that supports the light-emitting module in an orientation in which the light is emitted into the first edge surface of the light guide plate,
wherein the electrical conductor directly or indirectly connects the light guide plate and the support.

4. The image display device according to claim 3, wherein the electrical conductor and the shade are concealed by the display panel in a front view of the image display device.

5. The image display device according to claim 4, further comprising:
a light guide panel that is fixed to the support in an orientation that blocks the light emitted frontward by the light-emitting module, wherein
the shade blocks the light from being emitted from between the light g panel and the light guide plate.

6. An image display device, comprising:
a display panel that displays an image on a front surface;
a light guide plate that is disposed on a rear surface of the display panel and has edge surfaces including a first edge surface, a second edge surface opposite to the first edge surface, and third edge surfaces on lateral surfaces of the light guide plate between the first edge surface and the second edge surface;
a support plate that supports the light guide plate, and extends beyond at least one lateral surface of the light guide plate in a front view of the light guide plate;
a light-emitting module that emits light into the first edge surface of the light guide plate;
a shade that covers, in a lateral view of viewing the light guide plate and the light-emitting module to face a third edge surface among the third edge surfaces, a gap between the light-emitting module and the first edge surface of the light guide plate on a third edge surface side, and seals, in the lateral view, the gap between the display panel and the support plate to block light that leaks from the gap;

electrical conductors disposed at a periphery of the light guide plate; and a support that is disposed, in the lateral view, in front of the light guide plate and the light-emitting module such that light does not leak frontward from the gap between the light guide plate and the first edge surface of the light-emitting module, and supports the light-emitting module in an orientation in which the light is emitted into the first edge surface of the light guide plate, wherein:

the shade and the electrical conductors are disposed on the lateral surfaces of the light guide plate, respectively, in a lengthwise direction of the first edge surface of the light guide plate in a state in which the shade overlap the electrical conductors.

7. The image display device according to claim 6, wherein no electrical conductor covers the first edge surface of the light guide plate.

\* \* \* \* \*